US011493464B2

(12) United States Patent
Voutilainen (10) Patent No.: US 11,493,464 B2
(45) Date of Patent: Nov. 8, 2022

(54) DETERMINING AN ELECTRICAL PROPERTY OF INTEREST OF MATERIALS IN A TARGET REGION

(71) Applicant: Rocsole Ltd, Kuopio (FI)

(72) Inventor: Arto Voutilainen, Kuopio (FI)

(73) Assignee: ROCSOLE LTD, Kuopio (FI)

( * ) Notice: Subject to any disclaimer, the term of this patent is extended or adjusted under 35 U.S.C. 154(b) by 961 days.

(21) Appl. No.: 16/303,708

(22) PCT Filed: May 26, 2016

(86) PCT No.: PCT/FI2016/050368
§ 371 (c)(1),
(2) Date: Nov. 21, 2018

(87) PCT Pub. No.: WO2017/203095
PCT Pub. Date: Nov. 30, 2017

(65) Prior Publication Data
US 2020/0333275 A1    Oct. 22, 2020

(51) Int. Cl.
*G01N 27/02* (2006.01)
*G01N 27/22* (2006.01)

(52) U.S. Cl.
CPC ......... *G01N 27/026* (2013.01); *G01N 27/228* (2013.01)

(58) Field of Classification Search
CPC .... G01N 27/026; G01N 27/228; G01N 27/02; G01N 27/22
See application file for complete search history.

(56) References Cited

U.S. PATENT DOCUMENTS 5,460,046 A * 10/1995 Maltby ................. G01N 29/09
73/628
6,868,906 B1 * 3/2005 Vail, III ................. E21B 21/10
166/250.15
(Continued)

FOREIGN PATENT DOCUMENTS

JP        1362979 A2 *  5/2003 ........... E21B 47/022
WO    2011107657 A1    9/2011
(Continued)

OTHER PUBLICATIONS

Boyle A., et al., "Shape Deformation in Two-Dimensional Electrical Impedance Tomography", IEEE Transactions on Medical Imaging, vol. 31, No. 12, Dec. 2012, 10 pages.
Cheney, M., et al., "Electrical Impedance Tomography", SIAM Review, 41, 1, 1999, pp. 85-101.
(Continued)

*Primary Examiner* — Alexander Satanovsky
*Assistant Examiner* — Asm Fakhruddin
(74) *Attorney, Agent, or Firm* — Buchanan Ingersoll & Rooney PC (57) ABSTRACT

A method for determining an electrical property of interest of material(s) in a target region confined by a boundary surface comprises receiving measured values of a measurable electrical quantity; providing simulated values of the measurable electrical quantity for an initial approximation of the electrical property conditions; determining an objective function comprising observation difference between the measured and the simulated values as well a prior model, and determining an adjusted approximation; and providing, on the basis of the adjusted approximation, an estimation of the electrical property of interest. Simulated statistics of a position deviation in the observations is provided, caused by a difference of an effective position of the measurement probe from a predetermined reference position; and by providing the observation model to define the observations of the measurable electrical quantity to correspond to mea-
(Continued)

surements made with the measurement probe in the reference position.

13 Claims, 4 Drawing Sheets

(56) References Cited

U.S. PATENT DOCUMENTS

| | | |
|---|---|---|
| 7,496,450 B2 | 2/2009 | Ortiz et al. |
| 9,182,264 B2 | 11/2015 | Kaipio et al. |
| 2007/0133746 A1 | 6/2007 | Ortiz Aleman et al. |
| 2015/0355126 A1 | 12/2015 | Voutilainen et al. |
| 2016/0025663 A1 | 1/2016 | Lehikoinen et al. |

FOREIGN PATENT DOCUMENTS

| | | | | |
|---|---|---|---|---|
| WO | 2014/135741 | * | 3/2013 | ............ G01N 27/22 |
| WO | 2014118425 A1 | | 8/2014 | |
| WO | 2014135741 A1 | | 9/2014 | |

OTHER PUBLICATIONS

Hua et al., "Iterative Reconstruction Methods Using Regularization and Optimal Current Patterns in Electrical Impedance Tomography", IEEE Transactions on Medical Imaging, vol. 10, No. 4, Dec. 1991, pp. 621-628.

International Search Report (PCT/ISA/210) dated Oct. 7, 2016, by the Finnish Patent Office as the International Searching Authority for International Application No. PCT/FI2016/050368.

Kolehmainen et al., "The Inverse Conductivity Problem with an Imperfectly Known Boundary", SIAM Journal on Applied Mathematics, vol. 66, No. 2, Nov. 2005-Jan. 2006, pp. 365-383.

* cited by examiner

DETERMINING AN ELECTRICAL PROPERTY OF INTEREST OF MATERIALS IN A TARGET REGION

TECHNICAL FIELD

The present specification relates generally to monitoring industrial processes where process materials are stored or conveyed in pipes, vessels, or containers. In particular, the present specification is related to methods and apparatuses, as well as program codes to implement such methods, for monitoring, by determining an electrical property of interest of one or more materials present in a target region, various internal conditions in such process equipment. Said internal conditions may relate e.g. to phase interfaces, mixing, or material boundaries within such process equipment, and/or for monitoring scaling or other type of deposition formation on the surfaces of such equipment.

BACKGROUND

Electrical tomographic investigation methods, such as electrical tomographic imaging, cover various methods for investigating or monitoring a target region on the basis of determining an estimation of an electrical property of interest of one or more materials present in the target region by means of non-invasive measurements of the electrical property of interest, or of a secondary, measurable electrical quantity dependent on the primary electrical property of interest. The electrical property of interest may be, for example, permittivity or conductivity of the materials present in the target region.

The above methods are based on comparison of measured values of the measurable electrical quantity and corresponding simulations provided by an observation model for an approximation of the electrical property of interest conditions in the target region.

The estimated electrical property of interest may further be used as an indication of various material conditions in the target region. For example, in the case of determining an estimate of electrical permittivity in the target region, abrupt spatial changes in the permittivity may indicate boundaries between different materials or material phases.

In some applications, one specific type of material conditions within the target region to be investigated is possible presence of so called scale material on the equipment surfaces. In some technical fields, e.g. in oil industry, corresponding phenomenon may be called just deposition. Scaling is a well-known contamination problem which may occur in many different applications in process industry. Scaling, often called also fouling, means generally undesired deposition or accumulation of material on the surfaces of pipes, vessels, or other containers used for leading or storing flowable materials.

As a result of scaling, or generally deposition, an extra layer of solid material is formed on a process equipment surface. Thereby, the free inner zone (area or volume) within the pipe or other container, open for the presence of a flowable material, is changed. This can lead to many problems. For example, changed shape of the free inner volume causes disturbances to the fluid flow. At least, the reduced cross-sectional area of the free inner volume of a process pipe increases the flow resistance through the pipe. In an extreme case, the pipe can be entirely clogged, thereby stopping the entire process at issue.

In order to prevent dramatic problems e.g. due to unexpected clogging of a process pipe, or to optimize the use of scale inhibitors or the cleaning cycle of the pipe, one should preferably be able to monitor the scaling situation and its development in time.

From the point of view of determining the electrical property of interest in the free inner zone of the target region, scaling or other type of deposition may result in erroneous conclusions on electrical property of interest conditions in the free inner zone. Therefore, the effects thereof on the measurements should be compensated. In other applications, the scaling itself and the properties thereof may be of the main interest.

In prior art, scaling or other types of deposits has been monitored or diagnosed e.g. with camera-based techniques, wherein a camera is installed in the process equipment to be analyzed, with acoustic (typically ultrasound) methods, or by simple mechanical methods in which special intelligent test objects are mounted onto process pipe walls. Recently, a solution enabling scale monitoring by means of an ECT process was disclosed in WO 2014/118425 A1.

In addition to scaling, another example of phenomena possibly disturbing the determination of the material properties in the inner zone of the target region is an annular flow forming a boundary layer of a material, different from the main material in the inner zone, on an inner surface of a process pipe or other process equipment. As one specific example, in oil industry, such annular flow may be formed by water. Similarly to scaling, an annular flow of a material differing from the material(s) in the inner volume shall be taken into account in the analysis to avoid false conclusions on the inner zone conditions.

It would be advantageous in some applications if both the properties of scale or other type of boundary layer and the internal material conditions in the inner volume defined by such boundary layer could be determined reliably in a single process.

An issue relevant for each of the embodiments discussed above, it is essential that the observation model and the approximations of the electrical property of interest of material(s) present in the target region properly take into account the true measurement setup and geometry used in the measurements. Possible deviations of the details of the setup and the geometry used in the approximations from the actual ones may easily result in severe errors in the estimated electrical property of interest, and consequently in the conclusions concerning the material conditions in the target region.

SUMMARY

Some aspects relating to determining an electrical property of interest in a target region are specified by claims 1, 9, and 13.

In one aspect, a method may be implemented for determining an electrical property of interest in a target region in a process pipe or container, the target region being confined by, or alternatively comprising, a boundary surface formed by a body of the process pipe or container.

The electrical property of interest may be any directly or indirectly measurable electrical quantity, such as permittivity (which may be a real or a complex valued quantity) or electrical conductivity, or a property combining them both such as admittivity, of the material(s) present in the target region. In the case of permittivity or conductivity or a parameter combining them both, the method may lie generally within the field of electrical tomography. However, the electrical property of interest is not limited to the examples above. Generally, the method may be applied in investigating any electrical property of interest which can be measured, directly or indirectly, preferably non-invasively, i.e. from the outside of the target region.

The "target region" refers to a two-dimensional area or three-dimensional volume of interest within the process pipe or container, the internal conditions of which region of interest are to be determined. The "process" may refer to any kind of industrial process environment, especially one where a boundary layer effect, such as scaling or annular flow on process equipment surfaces may exist. These kinds of industrial processes exist e.g. in oil production, refining, and transport, other oil based industries, energy production, pulp industry, and food industry, without limiting the scope of this specification to these examples only.

The body forming the boundary surface may be any kind of structural part of the process pipe or container. For example, it may be a wall of a pipe or container, in which case the boundary surface may be e.g. the inner surface of the wall, or of an internal structure lying within such pipe or container.

The process pipe or container may be any kind of pipe, container, or vessel suitable for conveying or storing process material(s) therein. The process materials may be in liquid, solid, or gaseous form.

The method may be implemented as an electrical tomography process, in which the conditions in the target region, e.g. the electrical property of interest of the material(s) present in the target region, is reconstructed. The electrical property of interest determined by the method may be represented as images, e.g. as two-dimensional cross-sectional images of the target region. Then, the method may fall within the field of electrical tomographic imaging.

The basic principles of electrical tomography, including e.g. electrical impedance tomography EIT and electrical capacitance tomography ECT, and its use in various applications, are well known for those skilled in the art. In the case of electrical tomographic imaging, various image reconstruction algorithms known in the art may be used. On the other hand, the method above is not necessarily pure "imaging" comprising such image reconstruction. In some applications, it may be sufficient to determine just one or more characteristic parameters indicating or representing the electrical property of interest conditions in the target region.

In the case of said example of permittivity as the electrical property of interest, the method may generally be based on principles known in electrical capacitance tomography (ECT). In ECT, the permittivity in the target region may be determined. This may be implemented by finally reconstructing an image of the permittivity distribution in the target region. Permittivity, and in particular changes thereof may provide information on the internal material properties and distributions within the target region. A typical example of utilization of ECT is imaging a multi-phase flow in an industrial process, wherein an image showing the areas or volumes of different phases within the material flow is generated. One example of this kind of method and different practical issues involved therein is discussed in U.S. Pat. No. 7,496,450 B2. Recently, the inventors have found it being possible to use ECT also e.g. for monitoring scaling (fouling) of undesired deposit on, as well as possible wear of, process equipment surfaces in various industrial processes.

The method comprises receiving measurement data, the measurement data representing measured values of a measurable electrical quantity which is dependent on the electrical property of interest of one or more materials present in the target region, the measured values being or having been measured by a measurement probe which has a plurality of measurement elements in a measurement connection with the target region.

"Receiving" the measurement data, i.e. measurement results, of the measurable electrical quantity may mean just receiving the results, in the form of electronic data, of ready performed measurements. In other words, the method itself does not necessarily comprise performing the actual measurements, but the measured values of the physical quantity may be generated separately and just received, as measurement data, as a part of the method. The measurements may be carried out, for example, by a measurement probe from which the results of the measurements are transferred to an apparatus carrying out the actual analysis. The measurement results or the measurement data may also be stored in any appropriate memory means contained in the measurement probe, and collected or transferred therefrom afterwards. Such approaches allow, for example, an embodiment where the results of the measurements performed at a measuring site are sent electronically to an analysis site where the actual analysis and quantity of interest determination is carried out.

Alternatively, the method may also comprise performing measurements of the measurable electrical quantity, thereby providing measured values thereof. So, the method may comprise also generating the measured values which are then received for the actual analysis operations of the method. Such measurements may be performed according to the principles known in the field of tomographic investigation methods, in particular tomographic imaging, such as electrical tomographic imaging. Examples of such methods include electrical impedance tomography and electrical capacitance tomography.

The measurements may be performed generally according to the principles as such well known in the field of various measurement technologies and tomographic investigation methods. For example, in the case of real or complex valued permittivity as the electrical property of interest, the measured results may comprise current signals resulting in response to various voltage excitation signals.

Being dependent on the electrical property of interest of the material(s) present in the target region includes that the electrical property of interest itself may be the measurable electronic quantity. Alternatively, the measurable electrical quantity may be a secondary electrical quantity dependent on, or proportional to, the electrical property of interest of material(s) present in the target region. Then, the electrical property of interest is measured indirectly, by measuring the measurable electrical quantity.

The measurement connection between the measurement elements and the target region refers to the measurement elements' capability to supply and receive measurement signals to and from the target region with one or materials therein so that observations, i.e. measured values, of the measurable electrical quantity may be formed on the basis of those signals.

The measurement elements may comprise, for example, conductive electrodes capable of supplying and receiving, with the probe voltage and/or current signals to and from the target region, respectively. The measurement elements may be in direct contact with the target region and the material(s) therein. Alternatively, in some applications, there may be, for example, a layer of an electrically insulating material, or any other suitable material not preventing the measurement connection, between the measurement elements and the target region.

The method also comprises providing an observation model which defines the relationship between observations of the measurable electrical quantity, the observations corresponding to measurements made by the measurement probe, and the electrical property of interest of material(s) present in the target region. The observation model may be provided, for example, in accordance with the principles known in the field of electrical tomography. Generally, the observation model may define said relationship by means of any appropriate mathematical functions, elements, and operations.

As known for a skilled person, in tomographic investigation methods, in practice, it is necessary to construct a definitive model for the parameters to be estimated. This definitive model comprises the observation model, and possibly one or more prior models for setting specific preconditions or boundary conditions for one or more terms, parameters, or quantities of the observation model. Such limiting conditions may be set, for example, on the basis of knowledge about the physical and material conditions of the actual process environment at issue. Like the observation model, also possible prior model(s) may be prepared in accordance with principles as such known in the art. In a wider perspective, the implementation of prior models can be understood as utilizing virtual observations in the reconstruction.

As is clear for a person skilled in the art of electrical tomographic methods, "corresponding to measurements made by the measurement probe" mean that the simulated values shall correspond to the measured ones in the sense that they are simulated for the same measurement setup with a specific measurement element arrangement and intended measurement geometry, and for the same measurement procedure with specific types of excitation and response signals, as which are intended to be used in the actual, real measurements.

Further, the method comprises providing simulated observation data representing simulated values of the measurable electrical quantity, the simulated values being produced by the observation model for an initial approximation of the electrical property of interest of material(s) present in the target region.

"Providing" means that the method itself does not necessarily comprise determining or generating the entity at issue such as the observation model and/or the simulated data, but that entity may also be generated separately and be just received as an operation of the method. This allows, for example, an embodiment where the observation model and/or the simulated data are stored, in advance, electronically in an apparatus configured to perform the operations of the method. On the other hand, it is also possible to generate or determine such entities in the method.

The initial approximation of the electrical property of interest of material(s) present in the target region may be generated in accordance with known typical or probable electrical property of interest conditions within the target region. Such conditions may depend on the process type and details at issue.

With the measurement and simulated data available, the method comprises determining an objective function comprising observation difference between the measured and the simulated values of the measurable electrical quantity as well as one or more prior models, and determining, on the basis of the objective function, an adjusted approximation of the electrical property of interest of materials present in the target region. Thus, the objective function may be defined by the definitive model described above.

Determining the adjusted approximation on the basis of the objective function may comprise determining the adjusted approximation such that it produces a decrease in the value of the objective function. In such case, the objective function thus may be considered as a minimization function. In the case of minimizing the value of the objective function, the adjusted approximation may produce a decrease in the observation difference. However, taking into account, by the objective function, also the prior model(s) may result in situations where the adjusted approximation does not reduce the observation difference.

Thus, similarly to the general principles of tomographic reconstruction methods, the measured values of the measurable electrical quantity may be compared with corresponding simulated values calculated for a given initial approximation of the electrical property of interest of material(s) present in the target region. Based on the comparison and the observation difference determined thereby, and taking also into account the prior model(s), a new, adjusted approximation of the electrical quantity conditions in the target region, i.e. the electrical property of interest of material(s) present in the target region, is determined. The adjusted approximation may be determined so that for the adjusted approximation, the observation model produces simulated values of the measurable electrical quantity which are closer to the corresponding measured values than the simulated values for the initial approximation. Thus, the adjusted approximation may produce a decrease in the observation difference. However, this is not necessarily the case because the objective function also comprises the prior model(s).

The objective function and the value thereof is thus a measure of the correspondence between the observations determined by the observation model, as restricted in accordance with the prior model(s), and the actual measured values, the latter being affected by the real conditions in the target region.

In practice, comparing the measured values and corresponding observations according to the approximate mathematical model, and changing the parameters of the approximate mathematical model is generally known as an inverse problem or inverse calculation. Solving an inversion problem is typically based on rather complex computational algorithms performed at least partly automatically by means of suitable computation programs installed in a suitable processor. Several different algorithms suitable for the present invention are known in the art.

Said adjustment of the approximation may be repeated, and the process may be continued iteratively to further decrease the value of the objective function. When sufficiently low value is achieved, estimate data is provided on the basis of the (latest) adjusted approximation, representing an estimation of the electrical property of interest of material(s) present in the target region.

Determining the adjusted approximation of the electrical property of interest of materials present in the target region on so as to decrease the value objective function is one possibility only. In an alternative approach, as in Bayesian inversion framework, the objective function can be considered as a posterior probability density comprising probability densities defined by the observation model and prior model(s). In such a case, determining the adjusted approximation means generating dependent samples from the posterior density for determining an approximation for the expectation of the posterior density.

The estimate data may comprise the estimation in the form of a plurality of values of the quantity of interest representing the distribution of the electrical property of interest in the target region. Such data may then be used, for example, to illustrate said distribution as an image. Alternatively, the estimate data may comprise just one or a couple of indicative values of the electrical property of interest, representing the electrical property of interest conditions in the target region.

The method above may be carried out to determine the electrical property of interest of the one or more materials present in the target region at one specific time. Alternatively, it is also possible to solve the reconstruction of the electrical property of interest conditions as a dynamic problem allowing determination of the time-dependent development of the electrical property of interest conditions in the target region.

The estimation of the electrical property of interest, represented by the estimate data, may be considered as indicating the actual, i.e. true electrical quantity conditions in the target region. The electrical property of interest, in turn, may be considered as indicating various material conditions in the target region, such as mixing of and interfaces between different materials or material phases, to solid matter contents in a fluid, just to mention few examples. For example, abrupt changes in distribution of the electrical property of interest conditions close to the boundary surface may be interpreted as scale or some other type of boundary layer deposited or otherwise formed on that surface.

For example, in oil industry, examples of scale/deposition materials comprise bitumen, wax, paraffin, and asphaltene, and various scaling materials covered by a common term "mineral scaling". The latter comprises e.g. calcium carbonate and calcium sulphate based compounds, the latter comprising e.g. gypsum. In energy production, scaling can occur e.g. due to the deposition of contaminants contained in water in surfaces of boilers. Water contaminants that can form boiler deposits include e.g. calcium, magnesium, iron, aluminum, barium sulphate, and silica. The scale is typically formed as salts of these materials.

As an example of another type of boundary layer, an annular flow of a first material may be formed on the inner surface of a process pipe, the first material being different from a second material flowing in an inner zone limited by the annular flow in the pipe. For example, in oil industry, an annular flow may be formed of water.

It is to be noted that the applications of the method is not limited to the above examples of investigating the existence and properties of a boundary layer.

The method further comprises providing simulated statistics of a position deviation in the observations of the measurable electrical quantity, caused by a difference of an effective position of the measurement probe, which effective position is defined relative to the boundary surface, from a predetermined reference position.

The "simulated statistics" refer to statistical information of simulated effect of an effective position in the observations of the measurable electrical quantity. This simulated statistics of a position deviation is preferably generated according to probable effective positions in the actual target region at issue. In principle, such statistics may generated by any means. Some preferred examples, where statistic is generated by simulating a number of various effective positions and test approximations of the electrical property of interest conditions, are described in more detail below. The simulated statistics may comprise e.g. information about the mean value and covariance of the position deviation due to differences between effective positions and the reference position.

"Providing" means here that the method itself does not necessarily comprise determining or generating the simulated statistics, but that such simulated statistics may be generated separately and be just received as a step of the method. This allows, for example, an embodiment where the simulated statistics are stored electronically in an apparatus configured to perform the steps of the method. On the other hand, it is also possible to generate or determine simulated statistics in the method, possibly using one single apparatus or system serving also for determining the simulated statistics.

By "reference position" is meant an intended or assumed, normal or targeted position of the measurement probe relative to the reference surface. The "effective" position, in turn, refers to an actual position of the measurement probe, which may differ from the reference position.

As is clear for a skilled person in the art, if the simulated observation data is prepared by assuming the measurement probe to lie in the reference position but the actual position of the measurement probe during making the actual measurements is different, making conclusions on the basis of comparison of the simulated and the measured values of the measurable electrical quantity may result in strongly erroneous determination of the electrical property of interest. The above feature of including in the observation model also the position deviation which such effective position causes in the observations of the measurable electrical quantity may greatly relieve this problem, and result in greatly improved reliability of the electrical property of interest determination.

The purpose of the simulated statistics is to use it in the method as precondition(s) or boundary condition(s) for the position deviation to allow taking into account possible difference between the actual position of the measurement probe during the measurements and the reference position.

To summarize, in order to take into account possible deviation of the measurement probe from the reference position thereof, the observation model is provided in the method so as to define the observations of the measurable electrical quantity to correspond to measurements made with the measurement probe in the reference position, and be dependent on a position deviation which an effective position causes in the observations, the position deviation being determined to behave in accordance with the simulated statistics of a position deviation.

The observations of the measurable electrical quantity corresponding to the measurements made with the measurement probe in the reference position thereof relative to the boundary surface means that in the observation model, the measurement setup and geometry follow those of a targeted or normal situation with the measurement probe with the measurement elements lying in the reference position. Naturally, the actual position of the measurement probe during the measurements may vary from this assumption. In this sense, the observation model is "approximate" because no difference from the reference position is directly modelled by it. Instead, the effect of possible difference from the reference position is modelled via the position deviation which an effective position causes in the observations. In the case of an effective position identical to the reference position, the position deviation is naturally zero.

In other words, the actual simulations may be calculated, possibly erroneously in comparison to the actual measurement setup and geometry, in accordance with an assumed measurement setup with the measurement probe in the predetermined reference position relative to the boundary surface. Then, the effect of possibly differing actual position of the measurement probe from the reference position may be taken into account by means of the position deviation included in the observation model.

By restricting in the method said behavior of the position deviation in accordance with the simulated statistics of a position deviation, it is possible to limit the degrees of freedom of the position deviation to be estimated. In practice, the position deviation may be estimated by setting the simulated statistics of a position deviation as a prior model of the position deviation. Thus, it is presumed that, before one has any information on the target, the position deviation obeys the simulated statistics.

Prior model(s) may thus exist and be used in the method for the deviation as well as for the approximation of the electrical quantity of interest conditions in the target domain.

The simulated statistics according to which the position deviation described by it is determined to behave may necessitate in some situations an adjusted approximation which results in an increase of the observation difference, although the overall value of the objective function is decreased. Further, as discussed above, determining the adjusted approximation so as to decrease the value of the objective function is one possibility only.

Apart from the use of the deviation term in the observation model, in general, principles, processes, and algorithms which are, as such, known in the art may be used in the method.

With regard to the specific feature of the observation model determining the measurable electrical quantity to be also dependent on the position deviation, which position deviation is determined to behave in accordance with the simulated statistics, the principle is to provide an estimation i) with good correspondence with the simulated and measured observations, i.e. simulated and measured values of the measurable electrical quantity; ii) which estimation possesses features in accordance with assumptions based on prior knowledge of the target region; iii) the estimation being based on a position deviation used in the simulations which position deviation follows the simulated statistics.

To summarize, as a result, it is possible to produce an estimation of the electrical property of interest conditions in the target region which possesses realistic features.

In addition to the estimation of the electrical property of interest of material(s) in the target region, it is further possible to determine, on the basis of the adjusted approximation of the electrical property of interest, also an estimate of the position deviation, caused by the actual position of the measurement probe differing from the reference position, in the measured values. Based on this estimated position deviation, it is further possible to estimate the actual position of the measurement probe during the measurements.

In providing the simulated statistics, principles and methods known in the art may be used. In one embodiment, providing the simulated statistics of the position deviation comprises providing a simulation model defining the relationship between observations of the measurable electrical quantity, corresponding to measurements made by the measurement probe, and the electrical property of interest of material(s) present in the target region; and providing simulated observation position deviation data representing simulated values of the measurable electrical quantity produced by the simulation model for a plurality of test approximations of the electrical property of interest of material(s) present in the target region, said data comprising a first set of simulated values for the measurement probe in the reference position and a second set of simulated values for the measurement probe in an effective position, using a plurality of effective positions. The observation model with the position deviation set to zero means actually an observation model without any position deviation term. Such version on of the observation model used for simulating the position deviation may be considered as and called, for example, a simulation model.

The simulation model may be generally in accordance with the observation model. For example, the measurement geometry may be the same. However, for example, no deviation term is needed therein.

Thus, a plurality of test approximations of the electrical property of interest conditions in the target region may be selected, and for each of them, two different sets of simulated values may be calculated using the observation model.

Said using various effective positions means that at least two, preferably more, different modelled effective positions are used in generating the simulated values of the measurable electrical quantity for the plurality of test approximations of the electrical property of interest. For example, it is possible to use a unique effective position for each type of the test approximations so that the same effective position is used for one type of test approximation only. Alternatively, one single effective position may be used for several different test approximations of the electrical property of interest of material(s) in the target region.

The plurality of effective positions used in providing the simulated observation data may be selected according to probable actual positions expected in the application at issue.

By providing simulated values simulating the observations of the measurable electrical quantity, for a specific test approximation, both for a situation with the measurement probe lying in the reference position, and for a situation with the measurement probe being positioned off the reference position in an effective position, the effect of that specific effective position on the observations may be simulated. On the basis of a plurality of test approximations and a plurality of different modeled effective positions, the statistics of a position deviation which an effective position boundary distortion causes in the simulated observations may be determined.

Further, in the embodiment discussed here, providing the simulated statistics comprises determining, on the basis of the first and the second set of simulated values, simulated statistics of a position deviation which an effective position of the measurement probe differing from the reference position causes in the simulated values of the measurable electrical quantity.

As described above, the simulated statistics may then be used in the method to enable taking into account in the method possible difference of the actual position of the measurement probe during the measurements from the reference position. Thereby, high accuracy of determining, in the form of the estimate data, of the electrical property of interest conditions in the target region is possible.

On the other hand, the simulated statistics of a position deviation which an effective position causes in the simulated observations of the measurable electrical quantity, and the known modelled effective positions used in generating said simulated observations of the physical quantity, may be used to determine an estimate of an effective position matching the actual position of the measurement probe possibly differing from the reference position. Said estimate determination may actually mean determination of the most probable effective position having caused the estimated position deviation in the observations of the measurable electrical quantity.

In the above operations, the measurement data, the simulated observation data, the estimate data, and the observation position deviation data may each be received and/or provided in any appropriate electric form and format, allowing access to the values represented thereby.

In the above, the method is described with regard to one specific instantaneous or stationary situation in the target region only. Naturally, the method may be applied also for continuous monitoring of the target region, wherein the situation in the target region, in particular the electrical property of interest conditions therein, is determined continuously or dynamically, i.e. for different, consequent time instants. Then, the observation model may comprise information not only about the relationships between the observations and the electrical property of interest conditions as well as the position deviation but also about the time-dependencies of those factors.

The boundary surface may confine the target region, i.e. define at least a part of the boundary thereof. The boundary surface confining by the target region means that at least part of the target region is limited and its extension thus is defined by the boundary surface. This approach is particularly useful for the cases where the boundary surface is formed of an electrically conductive material, e.g. a metal. Metallic surfaces can be used in high temperatures and pressures and, in general, in various harsh environmental conditions.

Alternatively, the boundary surface may lie within the interior of the target region so that the target region extends behind the boundary surface. In this case, at least part of the body, a surface of which the boundary surface forms, is included in the target region. This arrangement is suitable, for example, for use in the case of an electrically insulating boundary surface.

The above method may be implemented for any appropriate measurement setup and geometry. In one embodiment, the target region lies in an inner volume of a process pipe, and the measured values of the measurable electrical quantity are measured by a pig type measurement probe located within the process pipe.

As known for those skilled in the art, a "pig type" measurement probe refers to pigging measurements wherein a measurement probe is used which can be inserted into and transported in a pipe, i.e. among the materials present in and possibly flowing in the pipe. Thus, in contrast to a measurement probe fixedly mounted to a process pipe or container, the position of a pig type measurement probe may vary because the measurement probe is not fixed to any stationary structure.

Due to the possibly continuously changing location of a pig type measurement probe in the process pipe, the position of the measurement probe relative to a predetermined boundary surface may also vary. Therefore, the method may provide particular advantages in a pigging application via taking into account in the determination of the electrical property of interest conditions that the position of the measurement probe may differ from an assumed or typical reference position.

In embodiments with a pig type measurement probe, the boundary surface may comprise, for example, an inner surface of the process pipe.

In one embodiment, the pig type measurement probe lies, when in the reference position, in the middle of the process pipe.

A pig type measurement probe may have an elongated shape and a longitudinal axis intended to be positioned, when in use, aligned with the longitudinal direction of the process pipe. Thus, in this embodiment, the reference position of the measurement probe means a position with the longitudinal axis of the measurement probe aligned with the longitudinal direction of the process pipe. Also in this embodiment, the reference position may refer to a position in the middle of the process pipe.

In one embodiment where the measured values of the measurable electrical quantity are measured by a pig type measurement probe located within the process pipe, the pig type measurement probe has a deformable outer surface having a reference shape, and the measurement elements lie on that outer surface. Thus, the reference shape refers to the initial or intended shape of the measurement probe outer surface. The deformability may result from a resilient or flexible material of the measurement probe body. For example, such material may comprise rubber or urethane.

In this embodiment, the method comprises further providing simulated statistics of a shape deviation in the observations of the measurable electrical quantity, caused by a difference of an effective shape of the outer surface of the measurement probe from the reference shape. Further, the observation model is provided so as to define the observations of the measurable electrical quantity to also depend on a shape deviation which an effective position causes in the observations, the deviation being determined to behave in accordance with the simulated statistics of a shape deviation. In practice, similarly to the position deviation, the shape deviation may be estimated by setting the simulated statistics of a shape deviation as a prior model of the shape deviation.

Thus, in this embodiment, the observation model defines the observations of the measurable electrical quantity to depend both on a position deviation and a shape deviation. Thereby, possible deviations from both the reference position and the reference shape of the measurement body outer surface may be taken into account in determining the electrical property of interest of material(s) present in the target region.

The position deviation and the shape deviation may be included in the observation model in one single deviation term or as separate position deviation and shape deviation terms.

This embodiment may provide great advantages in situations where, for example due to contact of the measurement probe with the wall of a tight process pipe, the outer shape and thus the positioning of the measurement elements of the pig type measurement probe changes. Change of the outer shape of the measurement probe may be reversible or irreversible, depending on the material of the measurement probe body and/or the outer surface thereof.

What is stated above concerning the details and steps of providing the simulated statistics of the position deviation apply, mutatis mutandis, also to the simulated statistics of the shape deviation.

The operations of the method and the various embodiments thereof discussed above are preferably performed at least partially automatically by means of suitable computing and/or data processing means. Such means may comprise e.g. at least one processor and at least one memory coupled to the processor. The at least one memory may store program code instructions which, when run on the at least one processor, cause the processor to perform operations according to various operations of the method. Alternatively, or in addition, at least some of those operations may be carried out, at least partially, by means of some hardware logic elements or components, such as Application-specific Integrated Circuits (ASICs), Application-specific Standard Products (ASSPs), or System-on-a-chip systems (SOCs), without being limited to those examples.

What is stated above about the details, ways of implementation, preferred features, and advantages with reference to the method aspect apply, mutatis mutandis, also to the apparatus aspect discussed hereinafter. The same applies vice versa.

According to an apparatus aspect, an apparatus may be implemented for determining an electrical property of interest of material(s) present in a target region in a process pipe or container, the target region being confined by or comprising a boundary surface formed by a body of the process pipe or container. The apparatus comprises a computing system which is configured to perform the steps of the method in accordance with any of the embodiments discussed above with reference to the method aspect.

The computing system may comprise any appropriate data processing and communicating equipment, elements, and components capable of carrying out the operations of the method discussed above.

From another terminology point of view, a computing system "configured to" perform a specific method operation means actually that the computing system comprises "means for" performing that operation. The computing system may comprise separate means for different operations. Alternatively, any of such means for performing those various operations specified above may be combined so that more than one operation is carried out by the same means. It is even possible that all those operations are carried out by the same means, e.g. by single data processing apparatus.

Any means for performing any of the above operations may comprise one or more computer or other computing and/or data processing components, units, devices, or apparatuses. In addition to actual computing and/or data processing means, the means for performing said operations may naturally also comprise any appropriate data or signal communication and connecting means, as well as memory or storage means for storing generated and/or received data.

Computing and/or data processing means serving as means for performing one or more of the above operations may comprise, for example, at least one memory and at least one processor coupled with the at least one memory, wherein the at least one memory may comprise computer-readable program code instructions which, when executed by the at least one processor, cause the apparatus to perform the operation(s) at issue. In addition to, or instead of, a combination of a processor, a memory, and program code instructions executable by the processor, means for performing one or more operations may comprise some hardware logic components, elements, or units, such as those examples mentioned above with reference to the method aspect.

In the above, the apparatus is defined as comprising the computational means only. Also a complete investigation system or apparatus may be implemented, wherein the apparatus comprises, in addition to the computing system, also a measurement system configured to carry out measurements of the measurable electrical quantity dependent on the electrical property of interest.

Thus, in this approach, the apparatus also comprises means for performing the measurements of the physical quantity. Such means, i.e. the measurement system, may be included in the means for receiving the measured values, or be implemented as a separate system or equipment configured to just perform the measurements, which may then be received by said receiving means.

The measurement system may be implemented according to the principles and means known in the field of tomographic investigation methods, such as electrical tomography, e.g. electrical impedance tomography or electrical capacitance tomography.

In an embodiment, the measurement system comprises a measurement probe having a plurality of measurement elements for being positioned with the measurement elements in a measurement connection with the target region. As discussed above with reference to the method aspect, the measurement elements may comprise, for example, metal electrodes capable of supplying and receiving electric signals, such as voltages and/or currents, to and from the target region, respectively.

In addition to a measurement probe, the measurement system may further comprise any appropriate control means for controlling the operation of the measurement probe.

In an embodiment, the measurement probe is of a pig type. The detailed structure and other features of a pig type sensor may be configured in accordance with the principles which are, as such, known in the art.

In yet another aspect, a computer program product may be implemented which comprises program code instructions which, when executed by a processor, cause the processor to perform the method according to any of the method embodiments discussed above. Such program code instructions may be stored on any appropriate computer-readable medium.

BRIEF DESCRIPTION OF THE DRAWINGS

In the following, various embodiments are described with reference to the accompanying drawings, wherein.

DETAILED DESCRIPTION OF THE EMBODIMENTS

Figure 1:
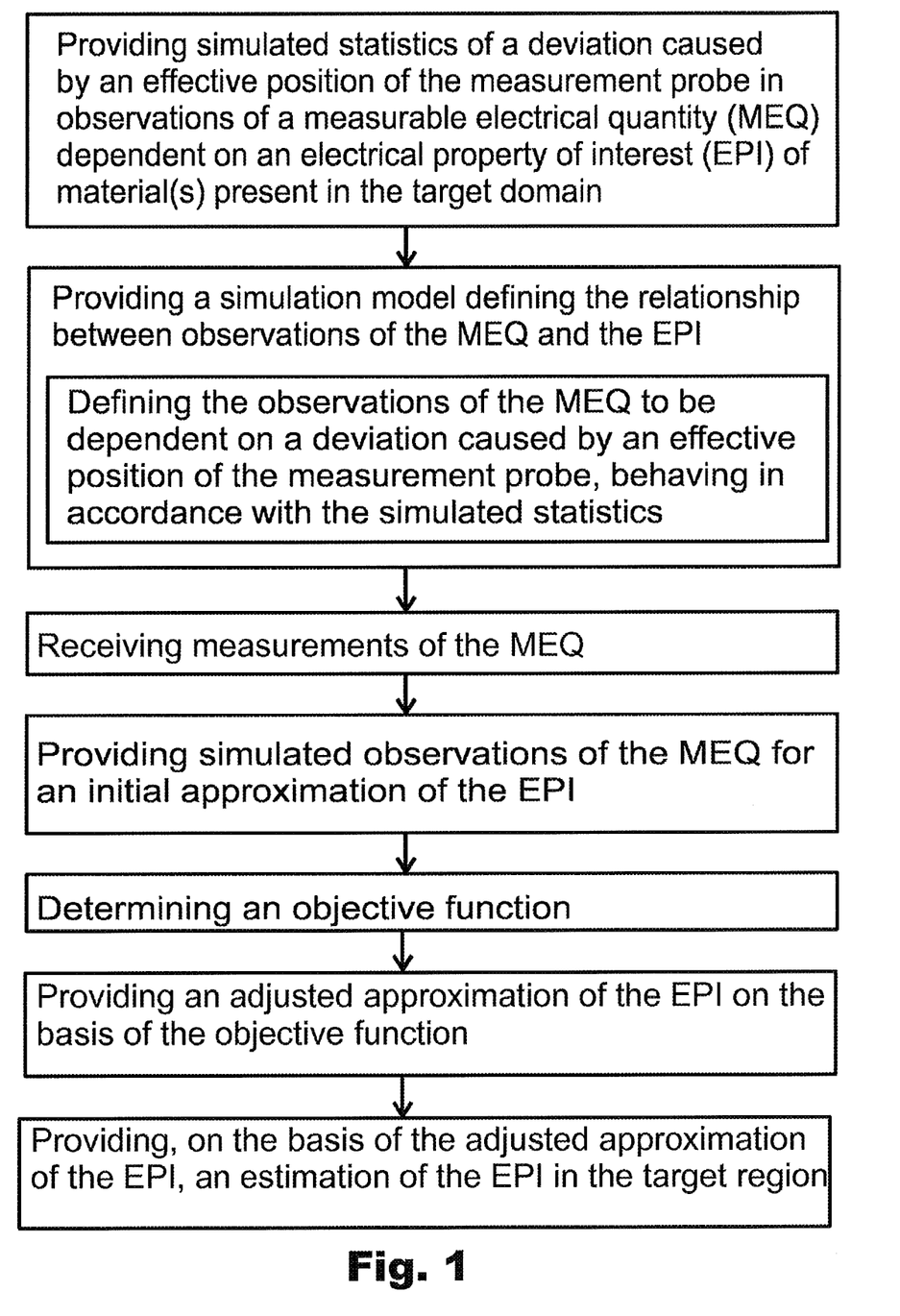
FIG. 1 is a flow chart illustration of an investigation method for determining an electrical property of interest of materials present in a target region.

The method illustrated in the flow chart of FIG. 1 may be used to determine an electrical quantity of interest of one or more materials which are present in a target region which lies in a process pipe or container and is confined by or comprises a boundary surface formed by a body of the process pipe or container. The boundary surface may be, for example, an inner surface of such pipe or container.

In the method, measurements of a measurable electrical quantity dependent on the electrical property of interest are utilized.

The electrical property of interest may be any electrical property which is observable by means of measurements of a measurable electrical quantity dependent on the electrical property of interest. One example of the electrical property of interest is electrical permittivity. Other examples include electrical conductivity and admittivity, the latter including both permittivity and conductivity.

The target region may lie e.g. within an industrial process equipment for storing and/or transporting various process materials, such as, for example oil and/or gas.

The measurements are carried out by means of a measurement probe having a plurality of measurement elements by means of which observations in the form of measured values of the measurable electrical quantity may be provided. The measurement probe has an intended position, hereinafter called a reference position, relative to the boundary surface.

In the process, simulated statistics of a position deviation is provided, the position deviation being caused by an effective position of the measurement probe relative to the boundary surface, the effective position differing from the reference position, in observations of the measurable electrical quantity.

The simulated statistics may comprise e.g. information about the mean value and covariance of some characteristic parameters of the position deviation. The simulated statistics may be determined beforehand or during the process, as one operation thereof.

Further, an observation model is provided in the method, which defines the relationship between the observations of the measurable electrical quantity and the electrical property of interest conditions in the target region. The model is determined to define the observations of the measurable electrical quantity to correspond to the measurements of the measurable electrical quantity, which naturally depend on the electrical property of interest conditions in the target region, and to depend also on a position deviation caused by an effective position of the measurement probe, the position deviation being determined to behave in accordance with the simulated statistics of a position deviation discussed above.

The observation model may be defined by means of one or more mathematical equations defining the relationships between the observations of the measurable electrical quantity measurable by means of the measurement probe, and the electrical property of interest conditions in the target region and the position deviation.

The simulated statistics mentioned above is preferably determined by operations comprising, for one thing, providing simulated observation position deviation data which represents simulated values of the measurable electrical quantity produced by a simulation model for a plurality of predetermined test approximations of the electrical property of interest of material(s) present in the target region, the simulated observation position deviation data comprising a first set of simulated values calculated for the measurement probe in the reference position and a second set of simulated values calculated for the measurement probe in an effective position, said data being provided using a plurality of different effective positions. Further, said operations comprise determining, on the basis of the first and the second set of simulated values, simulated statistics of a position deviation which an effective position of the measurement probe differing from the reference position causes in the simulated values of the measurable electrical quantity.

Measured values of the measurable electrical quantity are then received, and simulated observations corresponding to the measured ones are provided by means of the observation model for an initial approximation of the electrical property of interest conditions in the target region. Said correspondence means that the simulated observations are determined or calculated for the same measurement setup and geometry and measurement signals by which the actual measurements were carried out.

Then, an objective function is determined, which comprises observation difference between the measured values and corresponding observations according to the observation model, and one or more prior models.

An adjusted approximation of the electrical property of interest conditions in the target region is then provided. The adjusted approximation is determined on the basis of the objective function, for example, so that the adjusted approximation produces a reduced value of the objective function in comparison to the previous value determined for the initial approximation of the electrical property of interest conditions.

The adjustment of the approximations of the electrical property of interest conditions in the target region may be iteratively continued. In the case of determining the adjusted approximation so that a reduction in the value of the objective function is provided, this may be continued until a predetermined stopping criterion is reached.

An estimation of the electrical property of interest in the target region may then be determined on the basis of the (latest) adjusted approximation of the electrical property of interest. The estimation is determined as estimate data which may comprise estimated values of the electrical property of interest for different points or sub-regions of the target region. On the basis of the estimate data, the estimation may be used, for example, to reconstruct two-dimensional or three dimensional image(s) of the electrical property of interest distribution in the target region.

The order of the method operations is not limited to that illustrated in FIG. 1 and explained above. The order of the operations may be any appropriate one. For example, the operation of receiving the measured values of the electrical property of interest may be performed at any stage before determining the observation difference and the objective function.

In the above process, a position deviation is taken into account in determining the electrical property of interest. The measurement probe may be a pig type one.

In other embodiments where the measurement probe is of pig type, the pig type measurement probe may have a deformable outer surface having a reference shape, and the measurement elements may lie on said outer surface. Then, the method may further comprise providing simulated statistics of a shape deviation in the observations of the measurable electrical quantity, the shape deviation being caused by a difference of an effective shape of the outer surface of the measurement probe from the reference shape. A shape deviation may then be correspondingly included in the observation model in addition to the position deviation Those may be included in the observation model as one single deviation term, or as separate position deviation and shape deviation terms. Thus, the observation model may be determined to define the observations of the measurable electrical quantity to correspond to the measurements of the measurable electrical quantity, which naturally depend on the electrical property of interest conditions in the target region, and to depend also both on a position deviation and a shape deviation caused by an effective position and an effective shape of the measurement probe, respectively.

In the above, the method illustrated in FIG. 1 was discussed at a conceptual level. In the following, the outline of a method, which may be generally in accordance with that of FIG. 1, is described from a more mathematical viewpoint. The example discussed below relates to an electrical capacitance tomography (ECT) method. It is to be noted, however, that the principles of the method apply to a non-imaging tomographic analysis also, and to methods utilizing measurements of some other measurable electrical quantity than those which may be measured in ECT measurements.

In fixed measurement geometry, the dependence of observations y on the quantity of interest E (i.e. permittivity distribution in the measurement region) can be described as $$y = f(\varepsilon) + e \quad (1)$$

where e is measurement noise and γ contains the parameters of the position and/or shape of the measurement probe. When measurement data is available from the measurement probe, this model can be used in the reconstruction of the permittivity distribution. Depending on the case, it may be necessary to incorporate prior models to the reconstruction process in order to find a unique and stable solution. In the Bayesian inversion framework the ultimate solution of the reconstruction problem is the "posterior density" that gives a full picture of the quantity to be estimated.

However, in multidimensional cases the posterior density may not be very illustrative, and therefore different point estimates are determined from the posterior density to visualize the solution. The determination of the most popular point estimate leads to a minimization problem, where the object function basically includes terms describing the mismatch between observed and modelled data as well as terms that favour solutions as defined by the prior models.

If the geometry, i.e. the position and/or shape of the probe, can vary, the model should be written as $$y = f(\varepsilon; \gamma) + e \quad (2)$$

where the parameter γ contains the information on the position and shape of the measurement probe, which both affect the measurement geometry. However, in some situations it may be difficult to determine γ. For instance, in the case of a measurement probe having an outer surface made of a soft material, freely maneuvering with flowing fluid and having no external mechanical structures that could keep the position fixed with respect to the pipe/vessel, it is impossible to know the exact measurement geometry at any time instant. Thus, the estimates for the quantity of interest can be of poor accuracy and therefore useless due to unknown measurement geometry. On the other hand, even if exact geometry for each measurement frame was known, the cost of generating geometry models for the implementation of the model (2) would be extremely high.

To solve the problem arising from the insufficiently known geometry, the basic idea is to construct a modified model to be used in data processing, assuming fixed probe position and shape, or a fixed measurement geometry, and introducing a new term to account for the deviation in measurement data resulting from the assumption of fixed geometry. In terms of eq. (2), such model can be written as $$y = f(\varepsilon; \gamma_0) + v + e \quad (3)$$

where $\gamma_0$ is the fixed reference value for the geometry parameters, and v is a compensation or deviation term to take into account the effect of incorrect value of the geometry parameters.

Since v depends on ε and γ, it is clear that eq. (3) cannot be used as such in the estimation. However, since v is by definition $$v = f(\varepsilon; \gamma) - f(\varepsilon; \gamma_0), \quad (4)$$

it is possible to investigate the statistics of v and its dependencies on other variables by generating sets of samples for ε and γ and then evaluating v from eq. (4) for each sample pair. The statistical model of v and its joint statistics with other variables may be called simulated statistics.

The statistical information on v is the key for being able to use model (3) in the implementing a model needed in the estimation of the quantity of interest. For instance, simulated statistics gives means for determining prior models for v, as well as tools for describing it with a lower dimensional approximation. Such prior models and low-dimensional approximations lead to models that can be used in the simultaneous estimation of both the quantity of interest and deviation (or its parameters in parametrized cases) simultaneously without information on exact measurement geometry when, depending on the case, qualitative or quantitative prior models for the quantity of interest have been specified.

In deterministic inversion framework, the model (3) and prior models for the quantity of interest and other quantities can be combined to form an objective function the minimizer of which can be understood as the best estimate for the quantity of interest. From the Bayesian point of view, same models can be used to construct a posterior probability density from which it is possible to determine the most probable solution, which is an optimization problem very similar or identical with the minimization in the deterministic approach. Another popular estimate that can be determined the posterior density is the posterior expectation which can be estimated either analytically (especially in low-dimensional cases) or by using sampling-based methods.

Figure 2:
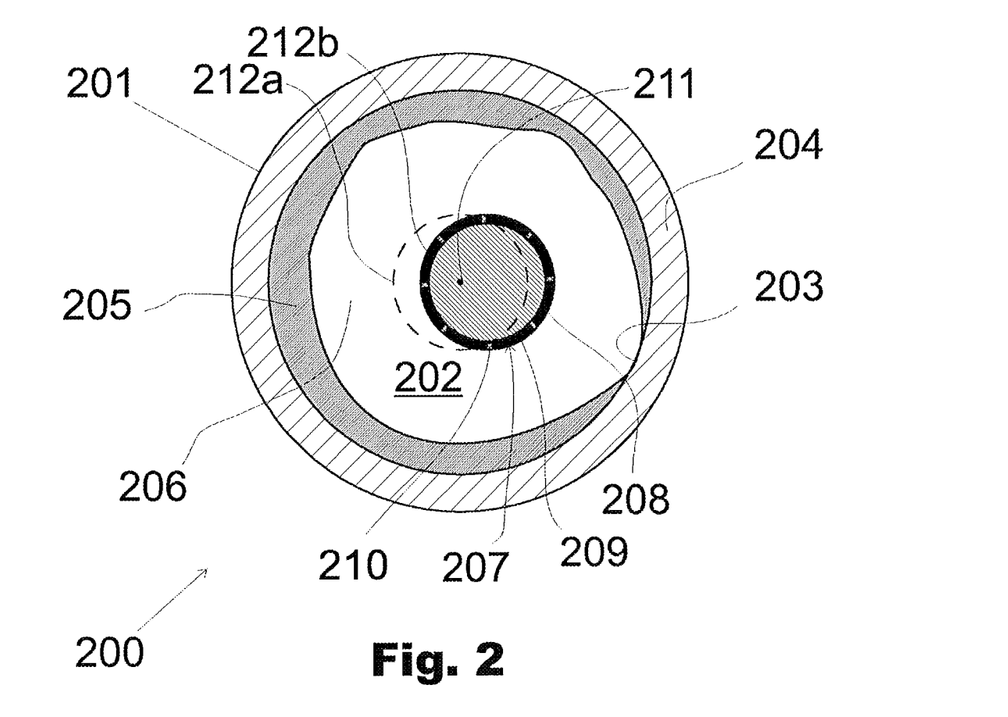
FIG. 2 shows a schematic cross-sectional view of a measurement setup for carrying out measurements of a measurable electrical quantity in a target region.
Figure 3:
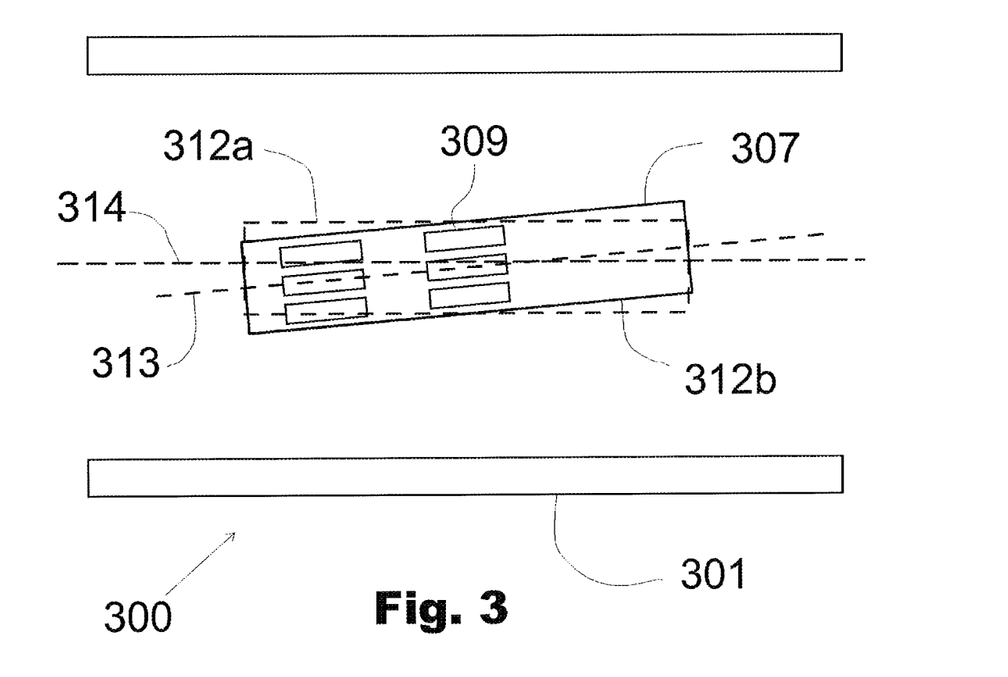
FIGS. 3 and 4 show schematic partially sectional side views of measurement setups for carrying out measurements of a measurable electrical quantity in a target region.

The measurement setups 200, 300 of FIGS. 2 and 3 may be used, for example, to carry out measurements for the method as discussed above with reference to FIG. 1.

FIG. 2 shows a schematic cross-sectional illustration of section of a process pipe 201 which may be, for example, a pipe for conveying oil therein. The inner volume within the pipe forms a target region 202 which may comprise just a single, two-dimensional plane or a three-dimensional volume.

In the example of FIG. 2, the pipe has a pipe wall 204 having an inner surface 203. The pipe wall or at least the inner surface thereof may be electrically conductive.

The pipe wall 204 forms a body, the inner surface 203 of which confines the target region 202. In other embodiments, a target region may also comprise at least part of the thickness of the pipe wall 204. In such case, also the properties of the pipe wall, which may be electrically insulating, and the electrical properties thereof may be investigated by the method.

On the inner surface 203 of the pipe wall, a boundary layer of a boundary layer material 205 is formed. The boundary layer material may be, for example, substantially solid scale material. In another embodiment, a boundary layer may comprise, for example, an annular flow of a boundary layer material different from a flowable material 206 present and flowing in the inner free zone confined by the boundary layer material.

A measurement probe 207, which may be of a pig type, is positioned within the inner volume of the process pipe 201. The measurement probe has a body with a substantially circular cross-section and comprises a plurality of measurement elements in the form of electrodes 208 on the outer surface 209 of the body, arranged as an electrode ring encircling the outer periphery of the measurement probe body. Adjacent electrodes are electrically insulated from each other by intermediate insulators 210.

The measurement probe 207 is positioned off the centre 211 of the process pipe 201 so that its effective position 212b is off a reference position 212a which lies in the middle of the pipe.

The electrodes 208 of the measurement probe 207 of FIG. 2 may be used to supply and receive, for example, voltage and/or current signals for measuring capacitances between different electrode pairs, capacitance serving as a measurable electrical quantity dependent on permittivity as an electrical property of interest of the materials 205, 206 present in the target region 2.

Using a measurement setup such as that of FIG. 2, capacitance measurements may be performed according to the principles known in the art. In general, the field of electrical capacitance tomography ECT, the measurements are typically carried out as follows. Voltage supply (e.g. in square-wave, sinusoidal or triangular form) is applied to one of the electrodes (an excitation electrode) while the other electrodes are grounded. Capacitances between all electrode pairs are measured (in this example, each "group" of electrodes comprises just one single electrode). The capacitance measurement is repeated so that each of the electrodes is used as an excitation electrode. Therefore as a general rule, if there are N electrodes in the measurement system, N*(N−1)/2 independent capacitance values are obtained. Capacitances depend on the permittivity distribution in the target region. Permittivity distribution of the target region can then be estimated based on the set of the measured capacitance values. On the basis of the permittivity distribution, behaviour and/or some physical quantities of the underlying process can be investigated.

The capacitance values measured by the measurement setup 200 of FIG. 2 may be used in a method for determining the permittivity conditions in the target region 202. Such method may be in accordance what was described above with reference to FIG. 1. Using such method, it is possible to estimate the permittivity distribution in the target region 202 within the process pipe 201. Such estimation may then be used to determine, for example, the presence and nature of the boundary layer of a boundary layer material 205 on the inner surface 203 of the process pipe.

The measurement setup 300 of FIG. 3 may be generally in accordance with that of FIG. 2. A measurement probe 307, which may be generally in accordance with that of FIG. 2, is positioned within a pipe 301. The measurement probe has an elongated shape so that the measurement probe extends along a fictitious longitudinal axis 313 thereof. The measurement probe 307 has an effective position 312b which is tilted relative to the process pipe 301 so that the longitudinal axis thereof is at an angle relative to a central axis 314, and thus to the longitudinal direction, of the process pipe 301. Thus, the measurement probe lies at an angle relative to a reference position 312a which is defined as lying aligned with the longitudinal direction of the process pipe 301.

In the measurement probe 307 of FIG. 3, there are two rings of electrodes 309 positioned sequentially when observed in the longitudinal direction of the measurement probe.

As discussed above with reference to FIG. 2, an offset of a measurement probe from a reference position, such as those illustrated in FIGS. 2 and 3, may be taken into account in a method where the measurements made by the measurement probe are used for determining the electrical property of interest conditions in a target region.

In other embodiments, an effective position of a measurement probe may be both off the centre of a pipe and tilted relative to it.

Figure 4:
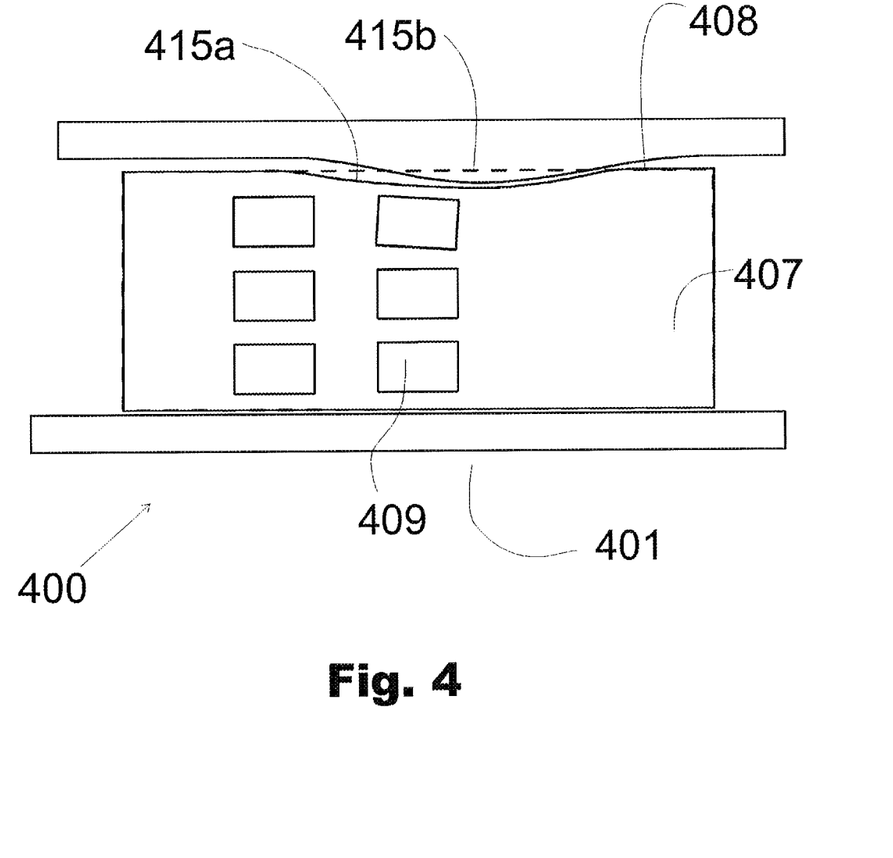

The measurement setup 400 of FIG. 4 may be generally in accordance with those of FIGS. 2 and 3. A measurement probe 407, which may be generally in accordance with those of FIGS. 2 and 3, is positioned within a pipe 401. The measurement probe 407 has an outer surface 408 having an effective shape 415a which has a depression caused by a protrusion in the wall of the pipe. The electrodes 409 lie on the outer surface of the measurement probe. The effective shape 415a differs, by the depression, from the original, i.e. the reference position 415b which may be, for example, substantially cylindrical. Due to the depression, the electrode configuration is slightly deviated from the original one, as illustrated in FIG. 4 by one of the electrodes having a slightly tilted position.

Any kind of offset of a measurement probe from the reference position or reference shape thereof changes the measurement geometry.

Similarly as discussed above with reference to FIG. 2 concerning an offset of a measurement probe from a reference position, also an offset from a reference shape of the outer surface of the measurement probe, as that illustrated in FIG. 4, may be taken into account in a method where the measurements made by the measurement probe are used for determining the electrical property of interest conditions in a target region.

The measurement probes 207, 307, 407 of FIGS. 2 to 4 may be connected by any appropriate wired or wireless means to an external computing system configured to control the measurement probe and receive measurement results therefrom, and perform the calculations and other method operations.

It is to be noted that permittivity as the electrical property of interest and capacitance (or a current or a voltage signal in response to a voltage or current excitation, respectively) as the measurable electrical quantity to be measured is one example only. The basic principles of the methods discussed above may be implemented in determining any electrical property of interest which may be investigated by means of one or more measurable electrical quantities dependent on that electrical property of interest. For example, in addition to or instead of permittivity, tomographic methods may be used to determine electrical conductivity or admittivity of material(s) present in a target domain in the target region.

Figure 5:
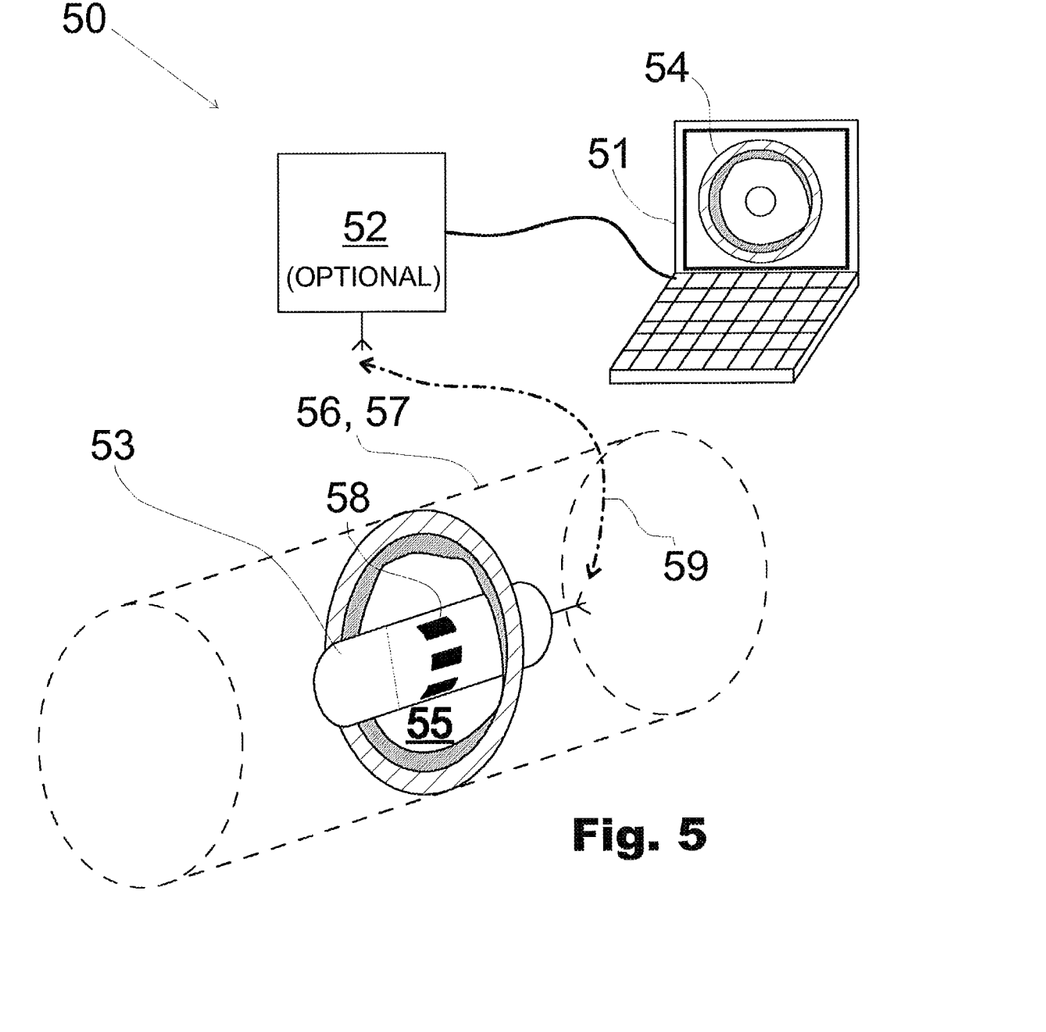
FIG. 5 shows an apparatus for determining an electrical property of interest of materials in a target region.

FIG. 5 illustrates schematically an apparatus 50 by means of which a method in accordance with those discussed above, where a pig type measurement probe 53 is used, may be carried out.

In the embodiment illustrated in FIG. 5, the measurement probe 53 is located within a process pipe 56 having a body which forms a boundary surface 57. The boundary surface defines a target region 55 within the process pipe.

In the operational core of system, there is a computer 51, serving as a computing system, comprising an appropriate number of memory circuits and processors for receiving, providing, and/or storing observation model, measured data, simulation observation data, estimate data, and for performing the computational operations of the method.

The apparatus further comprises a measurement electronics unit 52 and an elongated pig type measurement probe 53 having a plurality of electrodes 58 thereon. The support body and the electrodes may be, for example, generally in accordance with that discussed above with reference to FIG. 2. The measurement electronics unit and the measurement probe serve as parts of a measurement system of the apparatus 50. In the example illustrated in FIG. 5, the measurement electronics unit and the measurement probe are connected via a two-directional data connection 59, via which the measurement electronics unit may control the operation of the measurement probe and via which the measurement data collected by the measurement probe may be transferred to the measurement electronics unit and further to the computer 51.

In FIG. 4, the data connection is illustrated as a wireless one. However, as is clear for a skilled per, this is one example only, and any type of connection, including wired ones, between the measurement electronics unit and the measurement probe is possible which allows controlling the measurement probe and receiving measurement results therefrom.

Further, a measurement system comprising a specific measurement electronics unit is one embodiment only. In other embodiments, a measurement probe, which may be of a pig type, may be configured to carry out the measurements independently with or without continuous controlling by any external control means, and transmit the measurement data via a wireless or wired data transfer connection, or store it for later transfer, to a computing system. In such embodiments, a pig type measurement probe may be implemented as a compact-size and low-weight element which may propagate in process equipment without any physical connection to the computing system and carry out the measurements. In the case of wireless data transfer between the measurement probe and the computing system, measurement data may be transferred continuously, at specific intervals, or after completing a measurement process or a specific phase thereof. As an alternative to wireless or wired data transfer connection, measurement data may be stored on any appropriate movable storage means which may be removed from the measurement probe and installed in the computing system for receiving the measurement data therefrom.

Further, it is to be noted that the separate computer 51 and the measurement electronics unit 52 represent one way of implementation of the apparatus only. Naturally, an integrated apparatus may be implemented comprising any appropriate types of computing unit and measurement electronics. In such case, the measurement system, except of the actual measurement probe, and the computing system may be thus at least partially combined. Embodiments are also possible where no specific external measurement electronics unit outside the measurement probe is included in the measurement system. Further, a completely integrated apparatus is possible comprising all parts of the computing system and the measurement system in a single apparatus implemented, for example, in the form of a pig type measurement apparatus.

In the example illustrated in FIG. 5, the measurement electronics unit 52 is connected to the computer so that the measurement electronics unit can be controlled by the computer and that the measurement results can be sent to and received by the computer for further processing. The computer may comprise program code instructions, stored in a memory and configured, when run in a processor, to control the computer to carry out the operations of the method.

As a result of the method performed by the apparatus, an image 54 illustrating the estimated electrical property of interest conditions in the target region within the process pipe may be reconstructed. The electrical property of interest may be, for example, electrical permittivity or conductivity. The image may be formed according to estimate data representing an estimation of the electrical property of interest of material(s) present in a target region. As illustrated in FIG. 4, in such estimation, different sub-regions of the target region having different electrical property of interest conditions may be observable, indicating, for example, different materials present in the corresponding sub-regions. Such different materials may be, for example, scale deposition or another type of boundary layer in the form of an annular flow formed on the pipe inner surface serving as a boundary surface, and one or more other materials present in the free inner zone defined by such boundary layer.

It is obvious to a person skilled in the art that with the advancement of technology, the basic idea of the invention may be implemented in various ways. The invention and its embodiments are thus not limited to the examples described above; instead they may freely vary within the scope of the claims.

The invention claimed is:

1. A method for determining an electrical property of interest of material(s) present in a target region in a process pipe or container, the target region being confined by or comprising a boundary surface formed by a body of the process pipe or container; the method comprising receiving measurement data representing measured values of a measurable electrical quantity dependent on the electrical property of interest of material(s) present in the target region, measured by a measurement probe having a plurality of measurement elements in a measurement connection with the target region;

providing an observation model defining the relationship between observations of the measurable electrical quantity, corresponding to measurements made by the measurement probe, and the electrical property of interest of material(s) present in the target region;

providing simulated observation data representing simulated values of the measurable electrical quantity produced by the observation model for an initial approximation of the electrical property of interest of material(s) present in the target region;

determining an objective function comprising observation difference between the measured and the simulated values of the measurable electrical quantity as well as one or more prior models, and determining, on the basis of the objective function, an adjusted approximation of the electrical property of interest of materials present in the target region; and providing, on the basis of the adjusted approximation, estimate data (54) representing an estimation of the electrical property of interest of material(s) present in a target region, wherein the method further comprises providing simulated statistics of a position deviation in the observations of the measurable electrical quantity, caused by a difference of an effective position of the measurement probe, defined relative to the boundary surface, from a predetermined reference position;

and that the observation model is provided so as to define the observations of the measurable electrical quantity to correspond to measurements made with the measurement probe in the reference position, and depend on a position deviation which an effective position causes in the observations, the position deviation being determined to behave in accordance with the simulated statistics of a position deviation, wherein the target region lies in an inner volume of a process pipe, and the measured values of the measurable electrical quantity are measured by a pig type measurement probe located within the process pipe.

2. A method as defined in claim 1, wherein providing the simulated statistics of the position deviation comprises providing a simulation model defining the relationship between observations of the measurable electrical quantity, corresponding to measurements made by the measurement probe, and the electrical property of interest of material(s) present in the target region;

providing simulated observation position deviation data representing simulated values of the measurable electrical quantity produced by the simulation model for a plurality of test approximations of the electrical property of interest of material(s) present in the target region, comprising a first set of simulated values for the measurement probe in the reference position and a second set of simulated values for the measurement probe in an effective position, using a plurality of effective positions; and determining, on the basis of the first and the second set of simulated values, simulated statistics of a position deviation which an effective position of the measurement probe differing from the reference position causes in the simulated values of the measurable electrical quantity.

3. A method as defined in claim 1, wherein the measurement probe lies, when in the reference position, in the middle of the process pipe.

4. A method as defined in claim 1, wherein the measurement probe has an elongated shape and a longitudinal axis which lies, with the measurement probe in the reference position, aligned with the longitudinal direction of the process pipe.

5. A method as defined in claim 1, wherein the pig type measurement probe has a deformable outer surface having a reference shape, the measurement elements lying on said outer surface the method further comprising providing simulated statistics of a shape deviation in the observations of the measurable electrical quantity, caused by a difference of an effective shape of the outer surface of the measurement probe from the reference shape;

and wherein the observation model is provided so as to define the observations of the measurable electrical quantity to also depend on a shape deviation which an effective position causes in the observations, the deviation being determined to behave in accordance with the simulated statistics of a shape deviation.

6. A method as defined in claim 1, wherein the electrical property of interest is admittivity, permittivity, or conductivity.

7. A method as defined in claim 1, wherein the method comprises measuring, by the measurement probe, the values of the measurable electrical quantity dependent on the electrical property of interest of material(s) present in the target region.

8. An apparatus for determining an electrical property of interest of material(s) present in a target region in a process pipe or container, the target region being confined by or comprising a boundary surface formed by a body of the process pipe or container; the apparatus comprising a computing system configured to perform the steps of the method as defined in claim 1.

9. An apparatus as defined in claim 8, further comprising a measurement system for measuring the values of the measurable electrical quantity dependent on the electrical property of interest of material(s) present in the target region.

10. An apparatus as defined in claim 9, wherein the measurement system comprises a measurement probe having a plurality of measurement elements for being positioned with the measurement elements in a measurement connection with the target region.

11. An apparatus as defined in claim 10, wherein the measurement probe is of a pig type.

12. A computer program product comprising program code instructions which, when executed by a processor, cause the processor to perform the method according to claim 1.

13. A computer program product as defined in claim 12, stored on a computer-readable medium.

* * * * *